United States Patent [19]

Munch

[11] 3,712,324
[45] Jan. 23, 1973

[54] FLUIDIC ACCELEROMETER

[75] Inventor: Otto R. Munch, West Allis, Wis.

[73] Assignee: Johnson Service Company, Milwaukee, Wis.

[22] Filed: Jan. 26, 1970

[21] Appl. No.: 5,650

[52] U.S. Cl. .................................. 137/81.5, 73/515
[51] Int. Cl. ........................................... F15c 1/00
[58] Field of Search ............... 137/81.5; 73/503, 515

[56] References Cited

UNITED STATES PATENTS

| | | | |
|---|---|---|---|
| 3,276,464 | 10/1966 | Metzger | 137/81.5 |
| 3,450,145 | 6/1969 | Colston | 137/81.5 |
| 3,272,215 | 9/1966 | Bjornsen et al. | 137/81.5 |
| 3,459,054 | 8/1969 | Dexter | 137/81.5 X |
| 3,461,898 | 8/1969 | Bellman et al. | 137/81.5 |
| 3,513,710 | 5/1970 | Bates et al. | 137/81.5 X |
| 3,529,612 | 9/1970 | Rausch | 137/81.5 |
| 3,530,725 | 9/1970 | Schmidlin et al. | 137/81.5 X |
| 3,541,865 | 11/1970 | Brown | 137/81.5 X |

Primary Examiner—Samuel Scott
Attorney—Andrus, Sceales, Starke and Sawall and Arnold J. DeAngelis

[57] ABSTRACT

This disclosure includes a fluidic accelerometer in the form of a split looped planar conduit terminating in a pair of opposed nozzles and having a center supply connection to establish flow in opposite directions. A summing impact modulator or other fluidic amplifier is connected to the conduit nozzles to provide an amplified fluidic output signal. Angular acceleration of the conduit about an axis perpendicular to the plane of the conduit results in a pressure gradient along the conduit resulting in a differential pressure at the ends or nozzles which is impressed on the modulator with a corresponding output signal established.

5 Claims, 4 Drawing Figures

PATENTED JAN 23 1973 3,712,324

INVENTOR.
OTTO R. MUNCH

BY

Attorneys

FLUIDIC ACCELEROMETER

BACKGROUND OF INVENTION

This invention relates to a fluidic accelerometer and particularly to an accelerometer providing a fluidic signal in accordance with the acceleration of a fluid conducting apparatus.

Generally, accelerometers have employed mechanism wherein mechanically movable parts produce a related output signal. Although such devices have provided satisfactory results, they have certain distinct disadvantages from the standpoint of expense, reliability and the like.

SUMMARY OF PRESENT INVENTION

The present invention is particularly directed to a fluidic accelerometer wherein the output signal results from the modifying of the flow characteristics of a fluid in passageway means by the acceleration of the flow passageway means.

Generally, in accordance with the present invention, a flow passageway means is provided with an intermediate input supply means. The passageway means loops in opposite directions from said intermediate input means and the opposite sides of the loop terminate in a pair of output means. A differential fluid responsive means is interconnected to the end output means to compare the signal thereat and establish an output which is proportional to the acceleration of the flow passageway means. In accordance with a very significant aspect of the present invention, the intermediate supply means establishes a continuous supply of fluid to the accelerating passageway means. Applicant has found the continuous fluid supply produces a highly sensitive and substantial output pressure differential such that accurate and reliable detection of acceleration is obtained.

For the detection of angular acceleration, the fluid passageway means is preferably a coil means which includes an intermediate input. The coil means, which is preferably planar, includes one or more windings and encloses a selected area. Angular acceleration about an axis having a component perpendicular to the plane of the coil, causes a pressure gradient along the fluid passageway means which results in a pressure difference across the two output means of the coil. The pressure difference may be sensed by any suitable differential fluid signal responsive device to produce an output in accordance with the rotational acceleration of the coil. In a highly practical system, a coil of one or more windings is provided with a central supply. The opposite ends of the coil are interconnected to the opposite nozzles of a summing impact modulator. The differential pressure applied to the two nozzles will be dependent upon the angular acceleration in the plane of the coil as well as the area enclosed by the coil, the density of the fluid and the number of windings. The summing impact modulator produces a relatively high gain and readily detects small differential pressures.

Linear acceleration can also be detected by employing a loop configuration in which different changes in the flow characteristic in the loop, resulting from a forced change in the density of the flowing fluid and the acceleration, is detected, for example, as more fully disclosed in applicant's copending application entitled "Fluidic Linear Accelerometer" filed on the same day as this application and assigned to the same assignee. In this linear mode, the density to one or both sides of the intermediate input means is changed between the supply connection and the outer ends resulting in a pressure differential which is dependent upon the linear acceleration in the sensitive direction. The continuous flowing fluid from the intermediate input means increases the sensitivity of the accelerometer. The present invention thus provides a highly sensitive and reliable fluidic means for acceleration detection.

BRIEF DESCRIPTION OF DRAWINGS

The drawing furnished herewith illustrates the best mode presently contemplated by the inventor for carrying out the subject invention and further discloses the above advantages and features as well as others which will be readily understood from the following description.

In the drawing.

DESCRIPTION OF ILLUSTRATED EMBODIMENT

Figure 1:
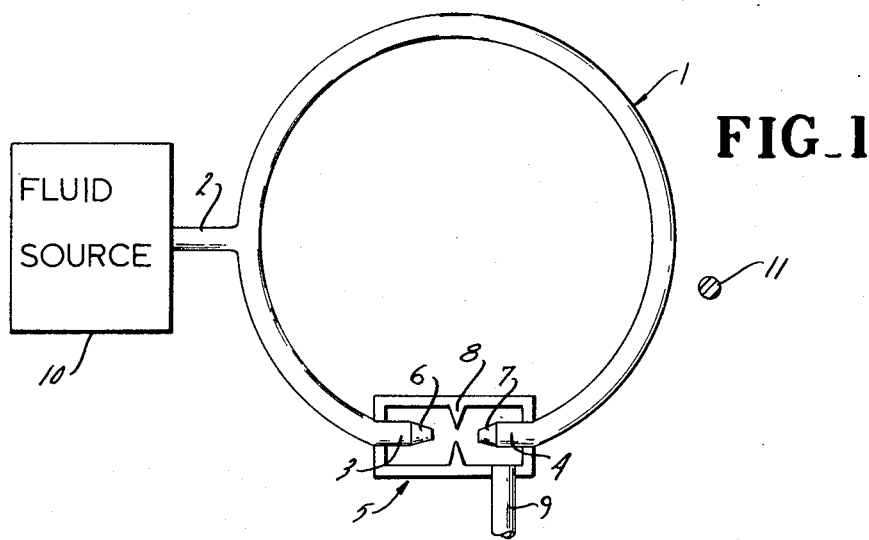
FIG. 1 is a diagrammatic illustration of an angular accelerometer employing a summing impact modulator to provide a fluidic output signal proportional to the angular acceleration of the accelerometer.
Figure 2:
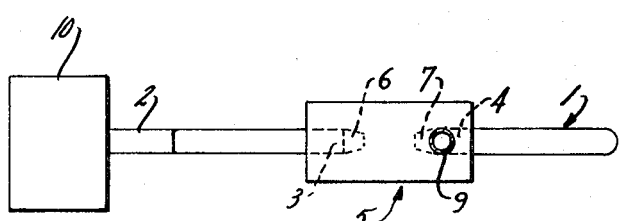
FIG. 2 is a side elevational view of the accelerometer shown in FIG. 1.

Referring to the drawing, and particularly to FIGS. 1 and 2, an angular accelerometer constructed in accordance with the present invention is illustrated including a single split flow conduit 1 having a fluid supply line 2 interconnected to line 1, supply line 2 being interconnected to a suitable supply 10. The illustrated conduit 1 is formed to define a single split loop which extends from the supply line 2 with a selected radius. The opposite ends 3 and 4 of the conduit 1 terminate in aligned and spaced relation to each other. A summing impact modulator 5, constructed in accordance with the teaching of the Bjornsen U.S. Pat. No. 3,272,215 and/or the related U.S. Pat. No. 3,388,713, is connected to ends 3 and 4 to detect the acceleration as hereinafter described. The modulator includes a pair of input nozzles 6 and 7 connected respectively to the ends 3 and 4 of conduit 1. A central wall 8 with a control orifice defines an output chamber about the nozzle 7. A signal proportional to the fluidic input signals as nozzles 6 and 7 and thereby proportional to the flow characteristics in the conduit 1 to the opposite sides of the fluid supply line 2, is established in the output chamber and at the output tap or line 9. In the illustrated embodiment of the invention, the supply line 2 is interconnected to a suitable supply 10 and the assembly is mounted to rotate about any desired axis, shown for purposes of explanation as a fixed axis 11 to one side of the assembly. The assembly may be mounted to accelerate about a moving axis.

The pressure of a fluid in a moving line at any given point depends upon the acceleration of the fluid in the observed direction. Generally, such pressure is linearly related to the acceleration. Therefore, the angular acceleration of the circular conduit, such as shown in FIG. 1, results in a pressure gradient in the flowing fluid along the length of the conduit 1. The differential pressure appearing at the ends 3 and 4 of a coil means including one or more corresponding planar conduits 1 and therefore at the nozzles 6 and 7 of the summing impact modulator 5, may be defined by the following equation:

$$\Delta_P = 2\pi R^2 NDY = 2ANDY$$

$\Delta_P$ = Pressure difference caused by angular acceleration
$N$ = Number of windings
$D$ = Density of fluid in the conduit 1
$Y$ = Angular acceleration
$R$ = Radius of coil winding
$A$ = Area enclosed by the coil winding The size of the apparatus is therefore generally determined by the density and acceleration range to actuate the output means or sensor.

As previously noted, the summing impact modulator 5 provides a high gain, pure fluid device which can detect relatively small pressure differences and thus provides an unusually satisfactory differential pressure sensor for the fluid accelerometer constructed in accordance with the present invention.

The pressure drop in the conduit affects the gain and sensitivity of the accelerometer and the apparatus is preferably constructed to minimize such losses.

The accelerometer may employ any suitable liquid, gas or mixture thereof as the fluid. For example, employing air at atmospheric pressure and a summing impact modulator having a gain of 500, an accelerometer having 20 corresponding planar windings of 1 foot radius and an acceleration of 2 radians per second squared would produce a differential pressure of essentially 100 dynes per centimeters square or 0.04 inches of water which the impact modulator would amplify to 20 inches of water. In many applications, the angular acceleration may be substantially greater. Within a missile, an accelerometer would be detecting acceleration of the order of 100 radians per second squared which would permit reduction of the coil radius to the order of 0.54 inches for the same number of windings and the same output pressure change. Air, of course, minimizes the problems of venting the impact modulator and the like. The low density of air and the like, however, reduces the output level of the apparatus. A liquid would correspondingly increase the output and provide a more sensitive apparatus.

Figure 3:
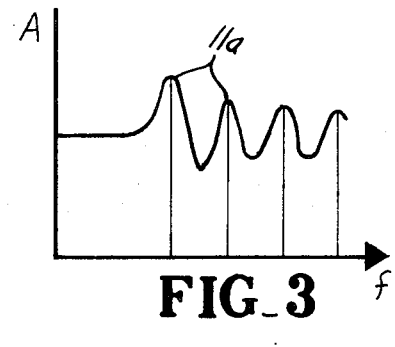
FIG. 3 is a typical frequency response characteristic of an accelerometer such as shown in FIG. 1.

The frequency response of an angular accelerometer such as shown in FIG. 1, is typically as shown in FIG. 3. The magnitude of peaks 11a of the different resonant frequencies is affected by the diameter of the conduit 1 or other passageway means. Reduction of the diameter will result in a corresponding reduction in the amplitude of the peaks because the harmonics or standing waves within the tube are more fully damped.

The linear acceleration of the planar loop shown in FIG. 1 will not affect the differential pressure appearing at the ends of the loops 3 and 4. If the conduit is not formed as a planar member, the instrument will have more than one sensitive axis.

An apparatus made in accordance with the present invention can be made sensitive to linear acceleration employing the concept of detecting the differential fluid signal resulting from the change in the density of the fluid flowing through a given conduit, as more fully described in applicant's previously identified copending application which discloses and claims a linear fluidic accelerometer.

Figure 4:
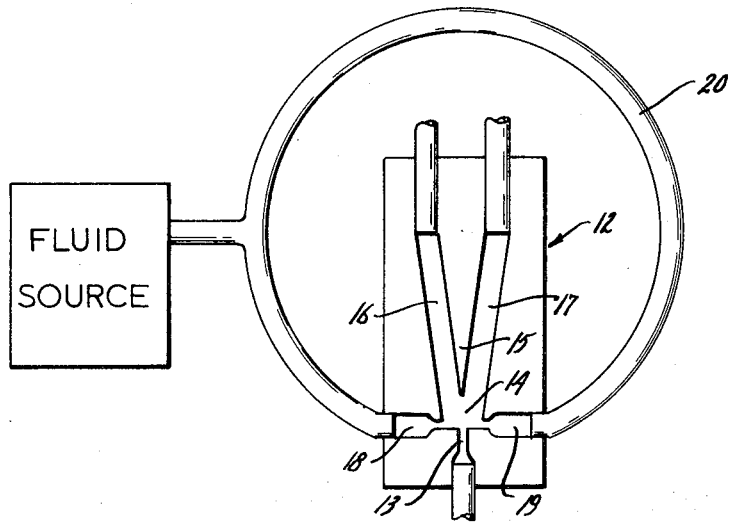
FIG. 4 is a diagrammatic illustration similar to FIG. 1 of angular accelerometer employing a deflection type fluid amplifier.

Furthermore, the invention may be applied to a beam deflection or to a wall attachment type fluid amplifier, as shown in FIG. 4. Generally, the amplifier 12 includes a main stream supply nozzle or port 13 establishing a power jet or stream in a chamber 14. The opposite wall of the chamber 14 includes a divider or splitter 15 defining a pair of output passageways or ports 16 and 17. A pair of opposed input ports 18 and 19 are located one to each side of the supply port 13 such that control streams therefrom engage the opposite sides of the main stream and to position the main stream relative to the two output ports 16 and 17.

The output ends of the angular accelerometer coil 20 are connected to two opposed input ports 18 and 19 to control the position of the main stream relative to the two output ports 16 and 17. The differential output, appearing at the output ports 16 and 17, is a measure of the angular acceleration of the assembly.

Although the illustrated accelerometers employ planar winding turns, the structure of the present invention may be of any desired configuration. For example, the planar windings may be of rectangular flow passageway configuration, or a helical coil. The opposite side of each winding may be offset with respect to each other and joined by appropriate passageway means. As previously noted, however, the pressure difference across the two output means is created by the angular acceleration about the axis perpendicular to the coil plane. If maximum sensitivity to one given axis is desired, each winding should be in a single plane which is perpendicular to that axis.

I claim:

1. A fluidic angular acceleration detection apparatus having an output dependent upon the acceleration of the apparatus comprising a flow passageway means having an intermediate input means adapted to be connected to a fluid supply to establish continuous fluid flow from said input means through said passageway means, said flow passageway means extending as an operatively closed passageway from said input means and terminating in a pair of end output means with essentially constant total output flow with acceleration from said input means, said passageway means being essentially planar and mounted for angular acceleration about an axis perpendicular to the plane of the passageway means and directly establishing a pressure gradient in the passageway means to the opposite sides of the input means, and a differential fluid signal responsive means connected to said pair of end output means to establish an output related to the pressure gradient produced by said acceleration and thereby proportional to the angular acceleration of the flow passageway means.

2. The fluidic apparatus of claim 1, wherein the signal responsive means includes a pure fluid amplifying means connected to the end output means and establishing an output proportional to the acceleration.

3. The fluidic apparatus of claim 1, wherein said differential fluid signal responsive means includes a differential fluidic amplifying means connected to the end output means.

4. The fluidic apparatus of claim 1, wherein the differential fluid signal responsive means is a summing impact modulator.

5. The fluidic apparatus of claim 1, wherein said input means is connected to a liquid supply means.

* * * * *